Patented Mar. 30, 1943

2,314,903

UNITED STATES PATENT OFFICE 2,314,903

POLYMERIZATION OF UNSATURATED COMPOUNDS HAVING THE CYCLOPENTADIENE NUCLEUS

Frank J. Soday, Upper Darby, Pa., assignor to The United Gas Improvement Company, a corporation of Pennsylvania No Drawing. Application April 25, 1938, Serial No. 204,229

10 Claims. (Cl. 260—80)

This invention pertains generally to the catalytic polymerization of unsaturated compounds such as cyclopentadiene and pertains particularly to the use of zinc chloride-organic solvent complexes as catalysts.

The invention will be described in connection with the production of cyclopentadiene polymer of a specific type. However, it is to be understood that it may be employed in the production of polymers of other types.

Cyclopentadiene may be polymerized into at least two broad types of polymers one of which is characterized by being soluble in solvents such as benzene, toluene, chloroform, carbon tetrachloride and high flash naphtha, while the other is characterized by being insoluble in these solvents.

The polymerization is usually carried out while the cyclopentadiene is in solution in a solvent.

I have discovered that the soluble type of polymer may be produced with zinc chloride-organic solvent complexes, and particularly zinc chloride-ether complexes, by a careful control of the polymerizing reaction.

Examples of zinc chloride complexes are zinc chloride-dimethyl ether complex, zinc chloride-diethyl ether complex, zinc chloride-di-isopropyl ether complex, zinc chloride-di-isobutyl ether complex, zinc chloride-di-N-butyl ether complex, zinc chloride-methyl isopropyl ether complex, zinc chloride-ethyl isopropyl ether complex, zinc chloride-methyl phenyl ether complex, and zinc chloride-ethyl phenyl ether complex.

The preparation of complexes of this character in general comprises adding zinc chloride to the solvent with agitation. As a result, if a reaction takes place, a definite chemical compound is formed.

There are at least four factors which influence production of soluble polymer. These four factors are (1) temperature, (2) concentration of cyclopentadiene, (3) proportion of uniformly distributed catalyst and (4) time.

Generally speaking, and all other conditions remaining the same, it appears that there is a threshold temperature for the formation of insoluble polymer, and that at all temperatures below this threshold temperature the soluble polymer results. It is recognized, that high concentrations of cyclopentadiene and/or high proportions of uniformly distributed catalyst might place this theoretical threshold temperature below commercially obtainable temperature levels. However, for reasonable concentrations of cyclopentadiene and reasonable proportions of uniformly distributed catalyst a threshold temperature can be shown to exist for any given concentration of cyclopentadiene with any given proportion of uniformly distributed catalyst.

Also generally speaking, and all other conditions remaining the same, it appears that there is a threshold concentration of cyclopentadiene for the formation of insoluble polymer, and that at all concentrations below this threshold concentration the soluble form of polymer results. The term "concentration of cyclopentadiene" as used herein and in the claims specifies the percentage by weight of total cyclopentadiene, whether reacted or not, after all of the materials have been combined. It is recognized that inordinately high temperatures and/or inordinately high proportions of uniformly distributed catalyst may make the theoretical threshold concentration difficult of determination. However, for reasonable temperatures and reasonable proportions of uniformly distributed catalyst a threshold concentration of cyclopentadiene can be shown to exist at any given temperature with any given proportion of uniformly distributed catalyst.

Also generally speaking, and all other conditions remaining the same, and assuming that all of the materials have been combined, it appears that there is a threshold proportion of uniformly distributed catalyst for the formation of insoluble polymer, and that with all proportions below this threshold the soluble polymer results. In this connection experiments indicate quite clearly that catalyst is apparently used up during the polymerization of soluble polymer, and that additional catalyst is required to convert the soluble polymer into insoluble polymer. If the proportion of uniformly distributed catalyst is such that there is no catalyst available for the formation of insoluble polymer, none will be formed.

On the other hand, threshold proportions of catalyst are not required to polymerize all of the cyclopentadiene into the soluble polymer, although it will recognized that a minimum proportion will be required for maximum yields.

It is recognized that inordinately high temperatures and/or inordinately high concentrations of cyclopentadiene may make the theoretical threshold proportion of uniformly distributed catalyst difficult of determination. However, for reasonable temperatures and reasonable concentrations of cyclopentadiene a threshold proportion of uniformly distributed catalyst can be shown to exist at any given temperature with any given concentration of cyclopentadiene.

Also generally speaking, and all other conditions remaining the same, it appears that there is a threshold reaction time for the formation of insoluble polymer, and that for all reaction times below this threshold reaction time the soluble polymer results. It is recognized that low temperatures, low concentrations of cyclopentadiene, and/or low proportions of uniformly distributed catalyst may cause this theoretical threshold reaction time to approach infinity. On the other hand high temperatures, high concentrations of cyclopentadiene and/or high proportions of uniformly distributed catalyst may cause this theoretical threshold reaction time to approach zero. However, for reasonable temperatures, for reasonable concentrations of cyclopentadiene, and/or for reasonable proportions of uniformly distributed catalyst, a threshold reaction time can be shown to exist.

Threshold reaction time, however, differs from the other three factors in that when the threshold reaction time becomes more than one hour the time necessary to form insoluble polymer approaches infinity at a very rapid rate.

When threshold conditions are just exceeded insoluble polymer is formed but not exclusively. This results in a mixture of soluble and insoluble polymers. When exceeding threshold conditions to a greater extent, however, insoluble polymer is formed exclusively. The band over which both soluble and insoluble polymers are formed varies in width with change in conditions. For instance this band decreases in width with increase in temperature.

Furthermore, the exact values of (1) temperature, (2) concentration of cyclopentadiene, (3) proportion of uniformly distributed catalyst and (4) time at which insoluble polymer begins to appear may vary somewhat with change in catalyst or solvent. However, the exact values may be readily determined by test.

The soluble polymer obtained varies in physical characteristics with the solvent used during the polymerization. For instance soluble polycyclopentadienes obtained by polymerizing cyclopentadiene by my new process in solvent naphtha, toluene, or benzene differ somewhat from each other as shown, for example, in the suitability of these polycyclopentadienes for coating metals for which they are unusually well suited. As an illustration, for certain purposes the benzene polymer is superior, the toluene polymer coming next but being, nevertheless, particularly well suited.

Accordingly, in the preparation of my polymerized cyclopentadiene a solution of cyclopentadiene in a chosen solvent such as toluene is employed.

I use as catalyst one or more zinc chloride-organic solvent complex and particularly one or more zinc chloride-ether complex.

Zinc chloride itself is generally unsatisfactory.

The complex catalysts may be employed as such, or in the form of suspensions, emulsions, or solutions in organic solvents of which benzene, toluene, solvent naphtha and petroleum naphtha are examples. Such suspensions, emulsions, or solutions are formed by adding the catalyst to the solvent followed by stirring. As an example, I find that a concentration of zinc chloride complex in toluene of 10.0% by weight of toluene is suitable as a catalyst suspension although any other concentration or solvent suitable for the purpose may be employed.

The reactants should not be combined too rapidly since under such circumstances the reaction may proceed too violently and cause local overheating with the production of insoluble polymer, or undesirable color bodies, or both, which it is proposed to avoid.

The catalyst may be added to the solution of cyclopentadiene, particularly when the catalyst itself is in solution or in suspension in a solvent, or the solution of cyclopentadiene may be added to a suspension, emulsion or solution of the catalyst. The reaction proceeds much more smoothly than when the catalyst is added to the cyclopentadiene. In the latter case no reaction appears to take place until a certain catalyst concentration is reached.

In either event, however, the addition of one material to the other is preferably accompanied by thorough stirring which is preferably rapid to insure uniform distribution not only of the materials but also of temperature.

In addition the reaction is preferably carried out in apparatus capable of temperature control such as a jacketed vessel provided with an agitator.

A very effective control of the temperature of the reaction and of local superheating is afforded when the preferred procedure is followed.

As an example, the proportion of catalyst may conveniently be between 0.5% to 25.0% by weight of cyclopentadiene provided the temperature of the reaction is controlled and/or the concentration of cyclopentadiene is sufficiently low, thus avoiding the formation of insoluble polymer.

A proportion of catalyst of 10.0% by weight of the total cyclopentadiene present is found to be convenient. It permits variation in temperatures and in concentrations of cyclopentadiene without the formation of insoluble polymer. Furthermore, there is less likelihood of discoloration of the final product than if a larger proportion of catalyst were used.

Incidentally, it appears that the molecular weight of the resulting soluble polycyclopentadiene may be varied somewhat by varying the proportion of catalyst. Other conditions remaining the same, higher proportions of catalyst yield polymers of higher molecular weight. This is very pronounced when the reaction temperature is 0° C., but is much less pronounced at 100° C.

For instance, at all temperatures below 50° C. gel-like polymers are obtained when high proportions of catalyst are employed just below threshold conditions. The ease with which gel-like polymers are obtained increases with decrease in temperature. These polymers are completely soluble.

Incidentally, the formation of gel does not indicate definitely the presence of insoluble polymer as shown above.

Discoloration of the product appears to increase and decrease with increase and decrease in proportion of catalyst so that lower proportions of catalyst yield materials of lesser discoloration.

Temperatures above 100° C. are preferably avoided and it is recommended that great care be taken to keep the temperatures throughout the reaction below this point.

Temperatures between −40° C. to 70° C. are suitable provided the reactants are sufficiently agitated or other steps taken to avoid local overheating. The preferred temperature range is between −40° C. and 30° C.

Incidentally it appears that the molecular weight of the resulting soluble polycyclopentadiene may be varied somewhat by varying the temperature. Other conditions remaining the same, lower temperatures yield materials of higher molecular weight. Furthermore, lower temperatures yield materials of lesser discoloration.

The increase in color due to increased reaction temperature is quite noticeable at 45° C. and becomes very pronounced as the reaction temperature approaches 100° C.

On the other hand, at 0° C. and even though the proportion of catalyst is fairly high, surprisingly light colored polymers are obtained.

Low reaction temperatures are therefore indicated.

Cyclopentadiene solutions of any suitable concentration can be used, keeping in mind what has been said with respect to threshold conditions, although I more often employ concentrations of cyclopentadiene of from 20 to 30% by weight of total reactants.

Incidentally it appears that the molecular weight of the resulting soluble polycyclopentadiene may be varied somewhat by varying the concentration of cyclopentadiene in the starting material. Other conditions remaining the same, higher concentrations of cyclopentadiene yield materials of higher molecular weight.

In summing up it may be said that higher molecular weight polymer can be made more advantageously at lower temperatures, with higher cyclopentadiene concentrations, and with high proportions of catalyst.

Under the recommended conditions the polymer is formed in good yield and with a satisfactory color.

The chosen time for the reaction may vary considerably keeping in mind what has been said about threshold conditions. I find that for practicable purposes and good yields other conditions should be chosen such that the reaction time is somewhere in the neighborhood of one hour or more. This is borne out by the fact that the yield increases with reaction time up to a certain point. The time is, of course, preferably chosen to obtain good yields.

The following specific example will serve to further illustrate the invention.

21 grams of zinc chloride-diethyl ether complex (containing 11 grams ZnCl₂) was added to a mixture of 70 grams of cyclopentadiene and 70 grams of benzene during a period of 10 minutes at a temperature of 0 to 5° C. The mixture was stirred for 2 hours at 20° C., and then permitted to settle whereupon two layers were formed. The layers were separated and the clear supernatant layer was hydrolyzed with 50 grams of 20% sodium carbonate solution. After agitating for 1 hour, 50 grams of CaO was added and the agitation continued for an additional period of one hour. A small quantity of filter cel was added and the mixture filtered.

The lower layer of polymerized material was washed with benzene and alcohol was added to precipitate the resin. The precipitated material was redissolved in benzene, neutralized with a Na₂CO₃ solution and filtered.

The combined filtrates contained 17.6 grams of polycyclopentadiene of excellent quality.

No insoluble polymer was obtained.

In the above example more or all of the polymerized material represented by the lower layer might have been held in solution by adding more benzene at the beginning or during the course of the reaction.

Furthermore, instead of separating and separately treating the layers, sufficient benzene might have been added after the reaction was complete to take into solution in the upper layer all of the polymerized material of the lower layer, that is, sufficient benzene to cause the layers to disappear into a single solution. Such solution would then be treated the same as the upper layer as set forth above.

The zinc chloride-diethyl ether complex used in the foregoing example was made by adding 11 grams of freshly made anhydrous zinc chloride to 10 grams of diethyl ether. The mixture was agitated in a closed flask during which heat was evolved. All of the zinc chloride dissolved. The solution was filtered and the catalyst was then ready for use.

Generally speaking, any other zinc chloride-organic solvent complex might be substituted. This applies particularly to the zinc chloride-ether complexes.

In the above specific example the cyclopentadiene is in diluted form before addition.

The addition of water or a water solution as above to hydrolyze the catalyst makes it possible not only to completely remove the activity of the catalyst and thus stop the reaction at any point, but also makes it possible to remove the corrosive and discoloring acid constituents of the catalyst by a suitable alkali. The alkali is preferably added with the water used to hydrolyze the catalyst, although it may be added later if desired. The failure to substantially completely remove the catalyst and its hydrolysis products may be the cause of serious discoloration. The insoluble reaction products formed during the hydrolysis and neutralization remain behind on the filter leaving a highly purified filtrate.

This polymer may be used as such, or it may be concentrated in a vacuum still of suitable design to give a product containing any desired higher concentration of polycyclopentadiene, including solid polycyclopentadiene, or it might be diluted to give any desired lower concentration, or a second solvent might be substituted such as a higher boiling solvent. This may be done either before or after concentration by adding the second solvent and distilling.

In the above example the particular temperatures were chosen to control the physical properties such as viscosity and color of the product. It will be noted that at no time did the temperature exceed 100° C. or even 70° C. The manner of combining the reactants, constant agitation, and brine cooling made it possible to prevent local overheating, and the formation of insoluble polymer.

In the above examples (1) temperature, (2) concentration of cyclopentadiene, (3) proportion of uniformly distributed catalyst, and (4) reaction time may be varied considerably in the production of soluble polymer having in mind what has been said with respect to threshold conditions. If it is found that insoluble polymer is obtained, one or more of the four conditions, namely (1) temperature, (2) concentration of cyclopentadiene, (3) proportion of catalyst, and (4) reaction time should be reduced until the soluble polymer is obtained.

Carrying out the polymerization in the presence of a solvent makes it possible to have any desired concentration of cyclopentadiene.

While in the above example no dilution of the product was required to facilitate hydrolysis and/or filtering, it is to be understood that dilution with a solvent may be employed, if desired, particularly in the case of highly viscous products.

Generally speaking, for the formation of soluble polymer to the exclusion of insoluble polymer and of extreme discoloration, temperatures should rarely exceed 100° C., and preferably should not exceed 70° C., concentrations of cyclopentadiene should rarely exceed 50% by weight of the total solution except possibly at low temperatures, and concentrations of uniformly distributed catalyst should rarely exceed 25% by weight of cyclopentadiene.

It should be kept in mind that there are for practical purposes minimum values for temperature, concentration of cyclopentadiene, proportion of catalyst and time, which practice will show ought to be exceeded to obtain reasonable yields. On the other hand, if the maximum values given in the previous paragraph for temperature, catalyst and cyclopentadiene were used simultaneously, insoluble polymer might be formed, even though the reaction time chosen were as short as good practice would permit.

It is by the observance of the preferred principles set forth herein that a quality product is produced in good yield.

While in the above specific examples toluene is used as a polymerization medium, it is to be understood that other suitable solvents may be substituted of which benzene, xylene, ethyl benzene, solvent naphtha, petroleum naphtha, carbon tetrachloride, and ethylene dichloride are examples. The products with benzene and toluene are preferred for specific uses as hereinafter referred to.

Although in the above particular description the cyclopentadiene is diluted before the addition of the catalyst, it is to be understood that variations are possible. For instance it is conceivable that all of the diluent may be first mixed with one of the reactants (either catalyst or unsaturated compound) and that the other reactant may be added in concentrated form, particularly if the principles set forth herein are closely observed. Or the larger part of the diluent may be added to one of the reactants so that the other is relatively concentrated. It is also conceivable that, with the exercise of extreme care and the closest adherence to the principles set forth herein, both reactants might possibly be employed in relatively concentrated form. Other variations are possible. When adding one liquid to another with agitation I find it convenient and often preferable to do this below the surface of one of the liquids.

Any other suitable alkali such as sodium hydroxide, sodium carbonate, sodium bicarbonate, magnesium hydroxide, an amine or other basic substance might be substituted for quicklime in the above specific examples, followed by a non-acidic drying agent such as $Na_2SO_4$, or soda lime. Both neutralization and drying is effected by CaO.

In case it is desired to form a highly concentrated solution of polycyclopentadiene, or to isolate it in solid form, it is not necessary to dry the solution after neutralization as the water present can be readily removed in the subsequent concentrating operation. The complete removal of insoluble material present, such as the neutralizing agent, is then effected by filtering the partially concentrated solution after the complete removal of the water present by distillation. After this step the solution can be further concentrated if desired.

The product may be used for many purposes, for instance, for lacquers generally, for varnishes either alone or in admixture with other resins, for enamels, for paints, or in fact for coating compositions generally. It is ideally suited to the coating of metals, for instance, for the coating of food containers as described and claimed in copending application, Serial Number 291,007, filed August 19, 1939, by Newcomb K. Chaney. This is especially true of the products polymerized in benzene and toluene.

If desired, it is possible to obtain soluble polycyclopentadiene of higher viscosity or of otherwise changed characteristics by starting with a solution of polycyclopentadiene and stopping the reaction before threshold conditions are exceeded.

While the invention has been particularly described in connection with the polymerization of cyclopentadiene, it is to be understood that it is applicable to the polymerization of substituted cyclopentadienes having the cyclopentadiene nucleus containing the characteristic conjugated double bonds. However, it is to be understood that the polymer particularly described has certain unique characteristics which distinguish it from polymers prepared from other starting materials. Examples of such other compounds are the alkyl, aryl, and alkyl-aryl.

It is to be understood that the above specific examples are by way of illustration. Therefore, changes, omissions, additions, substitutions, and/or modifications might be made within the scope of the claims without departing from the spirit of the invention which is intended to be limited only as required by the prior art.

I claim:

1. A process for producing benzene-soluble cyclic diene polymer by the catalytic polymerization of a cyclic diene compound selected from the class of cyclic dienes consisting of cyclopentadiene, alkyl substituted cyclopentadiene and aryl substituted cyclopentadiene in the substantial absence of polymerizable compounds not contained in said class, comprising mixing with said cyclic diene in the presence of a solvent to effect said polymerization in considerable proportion to said cyclic diene polymer a hydrolyzable zinc chloride-organic solvent complex previously formed by reacting zinc chloride with an organic solvent capable of reacting with zinc chloride to form said hydrolyzable complex; and preventing the polymerization of said cyclic diene from being effected entirely to benzene-insoluble cyclic diene polymer by thoroughly agitating the reaction mass while maintaining the reaction temperature below 100° C., the concentration of said cyclic diene below 50% by weight, and the proportion of catalyst to said cyclic diene below 25% by weight, and by stopping the reaction by inactivating said catalyst while benzene-soluble cyclic diene polymer is present in the reaction mass.

2. A process for producing benzene-soluble cyclic diene polymer by the catalytic polymerization of a cyclic diene compound selected from the class of cyclic dienes consisting of cyclopentadiene, alkyl substituted cyclopentadiene and aryl substituted cyclopentadiene in the substantial absence of polymerizable compounds not contained in said class, comprising mixing with said cyclic diene in the presence of a solvent to effect said polymerization in considerable proportion to said cyclic diene polymer a hydrolyzable zinc chloride-organic solvent complex previously formed by reacting zinc chloride with an organic solvent capable of reacting with zinc chloride to form said hydrolyzable complex; and preventing the polymerization of said cyclic diene from being effected largely to benzene-insoluble cyclic diene polymer by thoroughly agitating the reaction mass while maintaining the reaction temperature below 70° C., the concentration of said cyclic diene below 50% by weight, and the proportion of catalyst to said cyclic diene below 10% by weight, and by stopping the reaction by inactivating said catalyst while benzene-soluble cyclic diene polymer is the preponderant polymer present in the reaction mass.

3. A process for producing benzene-soluble polycyclopentadiene by the catalytic polymerization of cyclopentadiene in the substantial absence of polymerizable compounds other than cyclic dienes selected from the class of cyclic dienes consisting of cyclopentadiene, alkyl substituted cyclopentadiene and aryl substituted cyclopentadiene, comprising mixing with said cyclopentadiene in the presence of a solvent to effect said polymerization in considerable proportion to polycyclopentadiene a hydrolyzable zinc chloride-organic solvent complex previously formed by reacting zinc chloride with an organic solvent capable of reacting with zinc chloride to form said hydrolyzable complex; and preventing the polymerization of said cyclopentadiene from being effected entirely to benzene-insoluble polycyclopentadiene by thoroughly agitating the reaction mass while maintaining the reaction temperature below 70° C., the concentration of said cyclopentadiene below 50% by weight, and the proportion of catalyst to said cyclopentadiene below 25% by weight, and by stopping the reaction by inactivating said catalyst while benzene-soluble polycyclopentadiene is present in the reaction mass.

4. A process for producing benzene-soluble polycyclopentadiene by the catalytic polymerization of cyclopentadiene in the substantial absence of polymerizable compounds other than cyclic dienes selected from the class of cyclic dienes consisting of cyclopentadiene, alkyl substituted cyclopentadiene and aryl substituted cyclopentadiene, comprising mixing with said cyclopentadiene in the presence of a solvent to effect said polymerization in considerable proportion to polycyclopentadiene a hydrolyzable zinc chloride organic solvent complex previously formed by reacting zinc chloride with an organic solvent capable of reacting with zinc chloride to form said hydrolyzable complex; and preventing the polymerization of said cyclopentadiene from being effected largely to benzene-insoluble polycyclopentadiene by thoroughly agitating the reaction mass while maintaining the reaction temperature below 70° C., the concentration of said cyclopentadiene below 50% by weight, and the proportion of catalyst to said cyclopentadiene below 10% by weight, and by stopping the reaction by inactivating said catalyst while benzene-soluble polycyclopentadiene is the preponderant polymer present in the reaction mass.

5. A process for producing benzene-soluble polycyclopentadiene by the catalytic polymerization of cyclopentadiene in the substantial absence of polymerizable compounds other than cyclic dienes selected from the class of cyclic dienes consisting of cyclopentadiene, alkyl substituted cyclopentadiene, and aryl substituted cyclopentadiene, comprising mixing with said cyclopentadiene in the presence of a solvent to effect said polymerization in considerable proportion to polycyclopentadiene a hydrolyzable zinc chloride-organic solvent complex previously formed by reacting zinc chloride with an organic solvent capable of reacting with zinc chloride to form said hydrolyzable complex; and substantially completely preventing the conversion of said cyclopentadiene to benzene-insoluble polycyclopentadiene by thoroughly agitating the reaction mass while maintaining the reaction temperature below 70° C., the concentration of said cyclopentadiene below 50% by weight, and the proportion of catalyst to said cyclopentadiene below 10% by weight, and by stopping the reaction by inactivating said catalyst before substantially any benzene-insoluble polycyclopentadiene is present in the reaction mass.

6. A process for producing benzene-soluble polycyclopentadiene by the catalytic polymerization of cyclopentadiene in the substantial absence of polymerizable material other than cyclic dienes selected from the class of cyclic dienes consisting of cyclopentadiene, alkyl substituted cyclopentadiene and aryl substituted cyclopentadiene, comprising diluting said cyclopentadiene with a suitable solvent, diluting with a suitable solvent a hydrolyzable zinc chloride-organic solvent complex previously formed by reacting zinc chloride with an organic solvent capable of reacting with zinc chloride to form said hydrolyzable complex, effecting said polymerization in considerable proportion to polycyclopentadiene by slowly adding said solution of cyclopentadiene to said diluted catalyst with thorough mixing while maintaining the reaction temperature below 70° C., the concentration of said cyclopentadiene below 50% by weight, and the proportion of catalyst to said cyclopentadiene below 10% by weight, and stopping the reaction by inactivating said catalyst before substantially any benzene-insoluble polycyclopentadiene is present in the reaction mass.

7. A process for producing benzene-soluble polycyclopentadiene by the catalytic polymerization of cyclopentadiene in the substantial absence of polymerizable compounds other than cyclic dienes selected from the class of cyclic dienes consisting of cyclopentadiene, alkyl substituted cyclopentadiene and aryl substituted cyclopentadiene, comprising mixing with said cyclopentadiene in the presence of a solvent to effect said polymerization in considerable proportion to polycyclopentadiene a hydrolyzable zinc chloride-ether complex previously formed by reacting zinc chloride with an ether capable of reacting with zinc chloride to form said hydrolyzable complex; and preventing the polymerization of said cyclopentadiene from being effected largely to benzene-insoluble polycyclopentadiene by thoroughly agitating the reaction mass while maintaining the reaction temperature below 70° C., the concentration of said cyclopentadiene below 50% by weight, and the proportion of catalyst to said cyclopentadiene below 25% by weight, and by stopping the reaction by inactivating said catalyst while benzene-soluble polycyclopentadiene is the preponderant polymer present in the reaction mass.

8. A process for producing benzene-soluble polycyclopentadiene by the catalytic polymerization of cyclopentadiene in the substantial absence of all other compounds polymerizable under the conditions obtaining, comprising mixing with said cyclopentadiene in the presence of a solvent to effect said polymerization in considerable proportion to polycyclopentadiene a hydrolyzable zinc chloride-organic solvent complex previously formed by reacting zinc chloride with an organic solvent capable of reacting with zinc chloride to form said hydrolyzable complex; and preventing the polymerization of said cyclopentadiene from being effected entirely to benzene-insoluble polycyclopentadiene by thoroughly agitating the reaction mass while maintaining the reaction temperature below 100° C., the concentration of said cyclopentadiene below 50% by weight, and the proportion of catalyst to said cyclopentadiene below 25% by weight, and by stopping the reaction by inactivating said catalyst while benzene-soluble polycyclopentadiene is present in the reaction mass.

9. A process for producing benzene-soluble polycyclopentadiene by the catalytic polymerization of cyclopentadiene in the substantial absence of all other compounds polymerizable under the conditions obtaining, comprising mixing with said cyclopentadiene in the presence of a solvent to effect said polymerization in considerable proportion to polycyclopentadiene a hydrolyzable zinc chloride-organic solvent complex previously formed by reacting zinc chloride with an organic solvent capable of reacting with zinc chloride to form said hydrolyzable complex; and preventing the polymerization of said cyclopentadiene from being effected largely to benzene-insoluble polycyclopentadiene by thoroughly agitating the reaction mass while maintaining the reaction temperature below 45° C., the concentration of said cyclopentadiene below 50% by weight, and the proportion of catalyst to said cyclopentadiene below 10% by weight, and by stopping the reaction by inactivating said catalyst while benzene-soluble polycyclopentadiene is the preponderant polymer present in the reaction mass.

10. A process for producing benzene-soluble polycyclopentadiene by the catalytic polymerization of cyclopentadiene in the substantial absence of all other compounds polymerizable under the conditions obtaining, comprising mixing with said cyclopentadiene in the presence of an aromatic hydrocarbon solvent of less than 8 carbon atoms to effect said polymerization in considerable proportion to polycyclopentadiene a hydrolyzable zinc chloride-organic solvent complex previously formed by reacting zinc chloride with an organic solvent capable of reacting with zinc chloride to form said hydrolyzable complex; and preventing the polymerization of said cyclopentadiene from being effected largely to benzene-insoluble polycyclopentadiene by thoroughly agitating the reaction mass while maintaining the reaction temperature below 45° C., the concentration of said cyclopentadiene below 50% by weight, and the proportion of catalyst to said cyclopentadiene below 10% by weight, and by stopping the reaction by inactivating said catalyst while benzene-soluble polycyclopentadiene is the preponderant polymer present in the reaction mass.

FRANK J. SODAY.